April 11, 1950  C. W. FAILOR  2,503,716
CODED TRACK CIRCUIT EMPLOYING FEEDBACK ENERGY
Filed March 10, 1949
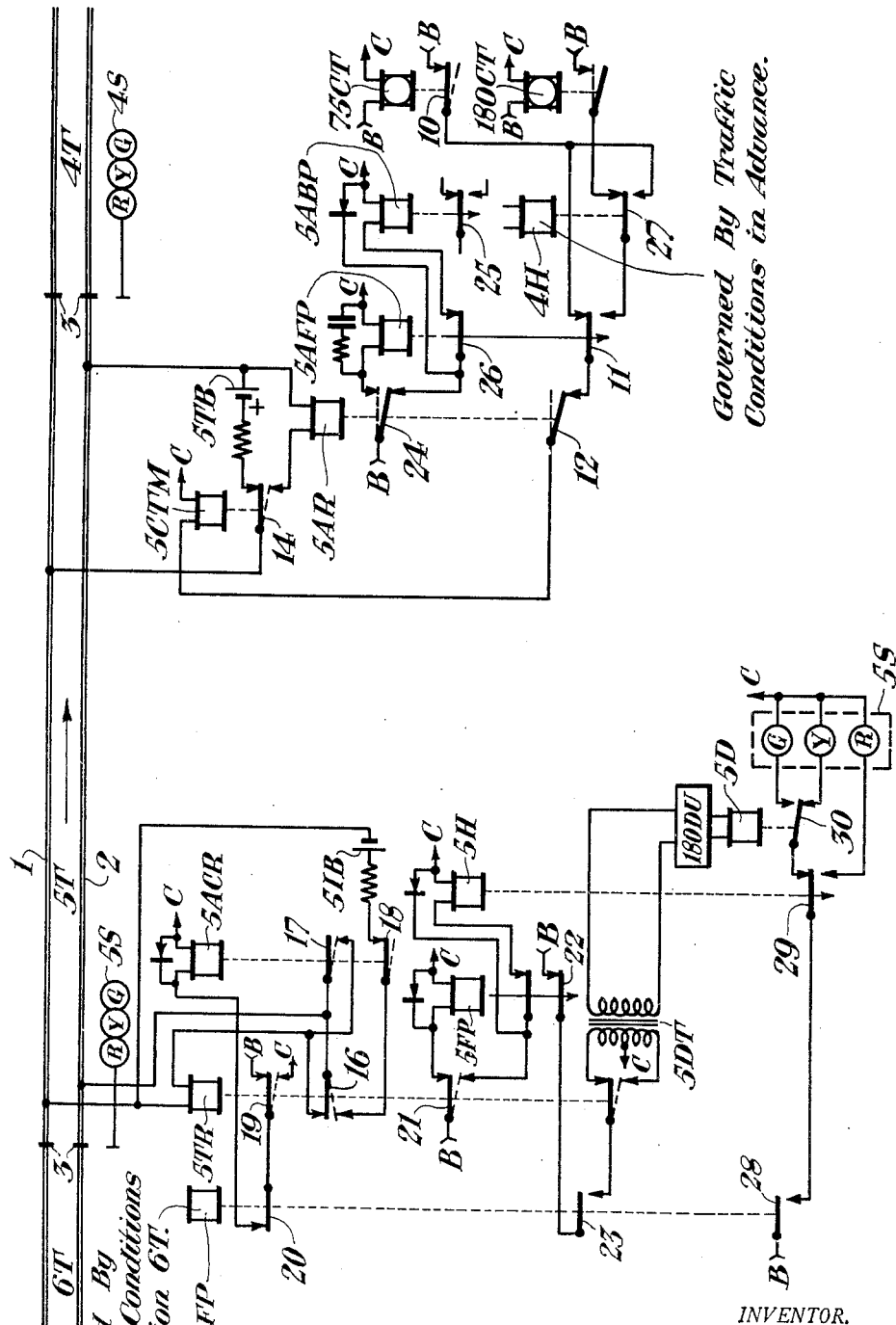
INVENTOR.
Charles W. Failor
BY
HIS ATTORNEY Patented Apr. 11, 1950

2,503,716

UNITED STATES PATENT OFFICE 2,503,716

CODED TRACK CIRCUIT EMPLOYING FEED-BACK ENERGY

Charles W. Failor, Forest Hills, Pa., assignor to The Union Switch & Signal Company, Swissvale, Pa., a corporation of Pennsylvania Application March 10, 1949, Serial No. 80,658

8 Claims. (Cl. 246—34)

My invention relates to coded track circuits for railroads and particularly to coded track circuits of the type in which master code energy is normally supplied in one direction over the section rails and feed-back or return code energy is supplied over the section rails in the opposite direction.

In systems of this type a transmitter relay located at one end of a track section has contacts effective in their first position to connect a code following approach relay across the rails of the track section, and effective in their second position to connect a source of energy across the section rails to thereby supply an impulse of master code energy to the section rails.

It has heretofore been proposed to include in the circuit by which the transmitter relay is operated by the code transmitters a back contact of the approach relay to thereby prevent operation of the transmitter relay to interrupt the circuit of the approach relay unless the approach relay releases. This prevents improper code following operation of the approach relay in the event foreign current is present in the section with which the approach relay is associated.

Since the transmitter relay cannot be operated to cause an impulse of master code energy to be supplied to the section rails until the approach relay releases, any delay in the release of the approach relay may result in a reduction in the length of the impulses of master code energy. If these are shortened appreciably the code detecting means governed by the track relay, or incorporated in cab signal equipment on a locomotive in the section, will not operate correctly.

The time required for the approach relay to release is governed by the length of the associated track circuit and by the level of the charge developed in the ballast of the track section.

A charge is developed in the ballast of a track section as a result of the supply of energy to the section rails. If this charge builds up to too high a level it will objectionably delay the release of the code following relays which are operated over the rails of the track section and necessitate a reduction in the length of the track section to prevent objectionable shortening of the master code impulses.

The level of the charge developed in the track ballast increases with increases in the percentage of the time during which energy is supplied to the section rails. When a track circuit is operated by master code energy of 180 code frequency and feed-back energy is supplied over the section rails, energy is supplied to the section rails for such a large proportion of the time that the charge developed in the track ballast builds up to such a level that the length of track circuit which can be operated is substantially shorter than that which could otherwise be operated. When a track circuit is operated by master code energy of 75 code frequency and feed-back energy is supplied over the section rails, energy is supplied to the section rails for a substantially smaller proportion of the time and the charge developed in the track ballast is correspondingly reduced with the result that there is a corresponding increase in the length of the track circuit which can be operated.

An object of this invention is to provide an improved coded track circuit of the type described which is arranged so that the charge built up in the track ballast as a result of the supply of energy to the section rails does not limit the length of the track section over which the track circuit may be operated.

Another object of this invention is to provide an improved coded track circuit of the type described which is arranged so that the approach relay will not distort or interfere with the master code energy.

A further object of the invention is to provide a coded track circuit of the type described which is arranged so that the track circuit is operated by coded energy of low code speed as long as feed-back or return code energy is supplied over the section rails.

Another object of the invention is to provide a coded track circuit of the type described which is arranged so that the track circuit is operated by coded energy of high code speed only when the supply of feed-back or return code energy over the section rails is cut off.

A further object of the invention is to provide an improved coded track circuit of the type described and arranged to employ master code energy of standard frequency code pattern.

Other objects of the invention and features of novelty will be apparent from the following description taken in connection with the accompanying drawing.

In practicing my invention, I arrange the circuit for the transmitter relay so that irrespective of traffic conditions in advance, energy of 75 code frequency is supplied to the transmitter relay as long as feed-back or return code energy is supplied over the section rails, and so that energy of 180 code frequency may be supplied to the transmitter relay only when the supply of feed-back or return code over the section rails is cut off.

In the drawing the single figure is a diagram of a stretch of railway track including a track equipped with a coded track circuit equipment embodying my invention.

Referring to the drawing, there is shown therein a stretch of railway track having track rails 1 and 2 over which traffic normally moves in the direction indicated by the arrow, that is, from left to right. The rails of the track stretch are divided by insulated joints 3 into the customary successive track sections. One complete track section designated 5T is shown together with portions of the adjoining sections 6T and 4T.

The equipment at the entrance end of the section includes a code following track relay 5TR, code detecting relays 5FP, 5H, and 5D, a feedback or return code generating relay 5ACR, a decoding transformer 5DT, and a battery 5IB.

The equipment at the exit end of the section includes a transmitter relay 5CTM, a code following approach relay 5AR, code detecting relays 5AFP and 5ABP, code transmitters 75CT and 180CT, and a track battery 5TB.

The code transmitters 75CT and 180CT may be of any suitable construction well-known in the art and are provided with contacts which are operated at rates such as to provide 75 or 180 energy impulses a minute, the impulses being separated by time intervals which are substantially as long as the energy impulses.

The equipment at each end of the section includes a suitable source of direct current such as a storage battery, not shown, the terminals of which are designated B and C in the drawing.

The equipment at the entrance end of the section includes a relay designated 6AFP which is governed in accordance with traffic conditions in section 6T so as to be picked up only when section 6T is vacant and to be released when section 6T is occupied. The means for controlling the relay 6AFP is not a part of this invention and this relay may be controlled in any suitable manner as, for example, in substantially the same manner as the relay 5AFP at the exit end of the section.

The equipment at the exit end of the section includes a relay 4H which is governed by traffic conditions in advance so as to be picked up only when section 4T is vacant and is released when section 4T is occupied. The relay 4H may be controlled in any suitable manner well-known in the art as, for example, in substantially the same manner as the relay 5H at the entrance end of the section. The relay 4H operates at times as hereinafter explained to determine whether the transmitter relay 5CTM is operated by 75 or 180 code frequency, while this relay may also govern the indication displayed by signal 4S.

In like manner, the relay 5H may be employed to control the supply of coded energy to the rails of section 6T in addition to being used to control the circuits for the lamps of signal 5S.

The equipment is shown in the condition which it assumes when the track stretch is vacant so that relays 4H and 6AFP are picked up. In addition, at this time, as hereinafter explained, the relay 5AFP is picked up so that energy is supplied over contact 10 of the transmitter relay 75CT, front contact 11 of relay 5AFP, and back contact 12 of the code following approach relay 5AR to the winding of the transmitter relay 5CTM with the result that its contact 14 is picked up and interrupts the circuit for connecting the winding of the approach relay 5AR across the section rails and establishes a circuit for connecting the track battery 5TB across the section rails.

The energy supplied from the track battery 5TB feeds from the positive terminal of the battery over front contact 14 of transmitter relay 5CTM to track rail 1, thence to the left-hand terminal of the winding of the track relay 5TR, through the relay winding, over front contact 16 of track relay 5TR to track rail 2, and thence to the negative terminal of the battery. The energy supplied to the winding of relay 5TR keeps the relay contacts picked up so that contact 16 maintains the circuit of relay 5TR and interrupts the circuit including front contact 18 of relay 5ACR for supplying energy from the battery 5IB to the rails of section 5T. In addition, as relay 5TR is picked up, its contact 19 establishes the circuit including front contact 20 of relay 6AFP for supplying energy to the relay 5ACR and its contacts are picked up. Also, as relay 5TR is picked up, energy is supplied over its front contact 21 to relay 5FP, and the contacts of relay 5FP are picked up so that its contact 22 in the circuit for supplying energy to the primary winding of the decoding transformer 5DT is closed, but at this time this circuit is open at contact 23 of relay 6AFP. Accordingly, energy is not supplied to the decoding transformer 5DT and therefore it is not supplied from this transformer to relay 5D and its contacts are released.

After a short time interval contact 10 of the code transmitter 75CT is moved to its open position, thereby interrupting the previously traced circuit for supplying energy to the transmitter relay 5CTM so that its contact 14 releases and interrupts the circuit for connecting battery 5TB across the rails of section 5T and establishes the circuit for connecting the approach relay 5AR across the section rails. When the supply of energy from the battery 5TB to the rails of section 5T is cut off, the track relay 5TR releases and its contact 19 interrupts the circuit for supplying energy to the relay 5ACR and connects the left-hand terminal of the winding of this relay to terminal C to thereby short-circuit the relay winding and relay the release of the relay contacts. In addition, the relay 5ACR is snubbed by a rectifier so that the relay contacts remain picked up for a short time interval subsequent to interruption of the supply of energy to the relay winding.

On movement of contact 16 of relay 5TR from its picked-up to its released position, the stick circuit for connecting the winding of relay 5TR across the rails of section 5T is interrupted and a circuit is established for connecting the battery 5IB across the section rails as long as contact 18 of relay 5ACR remains picked up.

On release of the contacts of relay 5TR, energy is supplied over its back contact 21 and over a front contact of relay 5FP to the winding of relay 5H so that the contacts of relay 5H are picked up. The windings of the relays 5FP and 5H are snubbed by rectifiers which render the relays slow enough in releasing so that contacts of each of these relays remain picked up during the periods in which the supply of energy to the relay winding is interrupted.

The energy supplied from battery 5IB feeds over the section rails and over back contact 14 of relay 5CTM to the winding of relay 5AR and picks up its contacts with the result that contact 24 establishes a circuit for supplying energy to the winding of relay 5AFP, while contact 12 of relay 5AR interrupts the circuit of relay 5CTM to insure that it remains released so that its contact 14 maintains the circuit of relay 5AR.

A condenser is connected across the terminals of relay 5AFP and is charged during the periods in which energy is supplied to the relay winding while this condenser serves to maintain the relay contacts picked up during the released periods of the contacts of relay 5AR. The various parts of the equipment are arranged and proportioned so that the condenser associated with relay 5AFP keeps the relay contacts picked up as long as relay 5AR is responding to coded energy even though the picked-up periods of the contacts of this relay are relatively short and the intervals between picked-up periods are relatively long.

As the contacts of relay 5AFP are picked up, its contact 11 in the previously traced circuit for supplying energy of 75 code frequency to the transmitter relay 5CTM is closed.

After a short time interval the contacts of relay 5ACR release and its contact 18 interrupts the circuit for connecting battery 5IB across the section rails, while contact 17 of relay 5ACR establishes the pick-up circuit for connecting the winding of relay 5TR across the rails of section 5T.

When the supply of energy from the battery 5IB is cut off, the relay 5AR releases and its contact 24 interrupts the supply of energy to relay 5AFP and establishes a circuit including a front contact of relay 5AFP for supplying energy to the relay 5ABP. The relay 5ABP is snubbed by a rectifier and is slow enough in releasing to remain picked up during the picked-up periods of the contacts of relay 5AR. Accordingly, as long as relay 5AR is responding to coded energy, contact 25 of relay 5ABP is picked up and this contact may control circuits which may be employed in any suitable manner for any appropriate purpose as, for example, to control a highway crossing signal or to control the locking of a switch in advance of section 5T.

In addition, on release of relay 5AR, its back contact 12 in the circuit for supplying energy to transmitter relay 5CTM is closed so that energy is supplied to this relay on subsequent movement of contact 10 of the code transmitter 75CT to its closed position.

On the subsequent supply of energy to the transmitter relay 5CTM and movement of its contact 14 to its picked-up position, the circuit of relay 5AR is interrupted and the track battery 5TB is again connected across the section rails. The energy supplied from the battery 5TB flows over the section rails and over front contact 17 of relay 5ACR to the winding of relay 5TR. Accordingly, the contacts of relay 5TR pick up and contact 16 of the relay establishes the relay stick circuit to maintain the relay winding connected across the rails of section 5T after picking up of contact 17 of relay 5ACR. In addition, on picking up of the contacts of relay 5TR, its contact 19 establishes the circuit including contact 20 of relay 6AFP for supplying energy to relay 5ACR and its contacts pick up with the result that contact 17 interrupts the pick-up circuit for relay 5TR, but, as explained above, energy continues to be supplied from the section rails to the winding of relay 5TR over the relay stick circuit established by front contact 16 of the relay. Accordingly, the contacts of relay 5TR remain picked up as long as energy is supplied over the rails of section 5T.

At the end of this period of master code energy the relay 5CTM releases to interrupt the circuit of the track battery 5TB and establish the circuit of the relay 5AR, while the track relay 5TR releases and establishes the previously traced circuit for supplying energy from the battery 5IB to the section rails for the release time of the relay 5ACR. This energy picks up the contacts of relay 5AR momentarily to energize relay 5AFP while the contacts of relay 5AR thereafter release so that contact 12 reestablishes the circuit of relay 5CTM before contact 10 of the code transmitter 75CT again moves to its closed position.

As long as the stretch is vacant, therefore, the coded track circuit equipment for section 5T is operated by coded energy of 75 code frequency and as a result of operation of the track relay 5TR the relays 5FP and 5H are picked up, while at this time the relay 5D is released so that the signal 5S, if lighted, will display its yellow or caution indication. In addition, at this time, the relay 5ACR operates to supply an impulse of feedback or return code energy from the battery 5IB to the rails of section 5T following each impulse of master code energy supplied over the section rails. These impulses of energy supplied from the battery 5IB are of sufficient duration to pick up the relay 5AR and to maintain it picked up for an appreciable time interval so that sufficient energy is supplied to relay 5AFP and the associated condenser to maintain the relay contacts picked up during the off periods or intervals between impulses of energy from the battery 5IB.

When the track circuit of section 5T is operated by coded energy of 75 code frequency, the intervals between successive impulses of master code energy supplied over the section rails are of such length that the approach relay 5AR has ample time in which to pick up and release before it is time for another impulse of master code energy to be supplied to the section rails. Furthermore, when the track circuit is operated by energy of 75 code frequency, the level of the charge built up in the track ballast is such that it does not objectionably delay release of the relay 5AR. Accordingly, even though transmitter relay 5CTM cannot be operated to supply an impulse of energy from the battery 5TB to the track rails until the relay 5AR releases, the impulses of master code energy supplied to the section rails at this time will not be distorted or reduced in length since the relay 5AR will be released and its contact 12 in the circuit of relay 5CTM will be closed before the contact 10 of the code transmitter 75CT completes this circuit.

If for any reason, foreign current should be present in section 5T and should be of such magnitude and such polarity as to pick up the contacts of relay 5AR, contact 12 of relay 5AR will interrupt the circuit of relay 5CTM and relay 5CTM will be certain to remain released and maintain the circuit for connecting the relay 5AR across the section rails so that relay 5AR is maintained picked up by the foreign current. Under these conditions, therefore, contact 24 of relay 5AR maintains the supply of energy to relay 5AFP and its contacts are picked up, but energy is not supplied to relay 5ABP and its contact 25 is certain to release and interrupt the circuit controlled thereby. Hence, as long as relay 5AR is maintained picked up, its contact 12 interrupts the circuit of relay 5CTM and there is no danger that contact 14 of relay 5CTM will be picked up to interrupt the circuit of relay 5AR and thus cause the contacts of relay 5AR to release. Under these conditions, therefore, relay 5ABP is certain to be released and will interrupt the circuit governed thereby, while relay 5CTM ceases to supply coded energy to the rails of section 5T and the track relay 5TR will be released so that relays 5FP and 5H become released to cause the signal 5S, when lighted, to display its red or stop indication.

When the equipment for section 5T is operating in the normal manner, that is, by energy of 75 code frequency, and a train moving in the normal direction of traffic, that is, from left to right, enters section 6T, the relay 6AFP releases and its contact 20 interrupts the circuit of relay 5ACR so that its contacts thereafter remain released and contact 18 interrupts the circuit of relay 5IB so that energy is no longer supplied from this battery to the rails of section 5T. After release of relay 5ACR, its contact 17 continuously maintains the pick-up circuit of relay 5TR and relay 5TR continues to respond to master code energy supplied over the section rails.

When the supply of energy from battery 5IB to the rails of section 5T is cut off, the relay 5AR remains released and its contact 24 no longer establishes the circuit for supplying energy to relay 5AFP and after a short time interval the contacts of this relay release so that contact 26 interrupts the circuit for supplying energy to relay 5ABP and the circuit for connecting the snubbing rectifier across the terminals of the relay winding. Accordingly, the contacts of relay 5ABP release promptly and contact 25 interrupts the circuit governed by its front contact.

After release of relay 5AFP its contact 11 transfers the operating circuit for relay 5CTM from the wire leading to contact 10 of code transmitter 75CT and connects this wire to the movable contact 27 of relay 4H so that, if traffic conditions are such that relay 4H is picked up, energy of 180 code frequency will be supplied to the transmitter relay 5CTM. Under these conditions, relay 5CTM will operate to supply energy of 180 code frequency to the rails of section 5T and the track relay 5TR will be operated at this code speed. Accordingly, relays 5FP and 5H will be maintained picked up, while at this time energy is supplied over front contact 22 of relay 5FP and back contact 23 of relay 6AFP to the primary winding of the decoding transformer 5DT. As the track relay is assumed to be operating at the 180 code rate the frequency of the energy supplied from the secondary winding of decoding transformer 5DT is such that sufficient energy is supplied through the resonant rectifier unit 180DU to the relay 5D to pick up its contacts. As a result, energy is supplied over back contact 28 of relay 6AFP, front contact 29 of relay 5H, and front contact 30 of relay 5D to the green or clear lamp of signal 5S and this signal displays its proceed indication to the approaching train.

At this time the relay 5AR is continuously released and its contact 12 in the circuit of the transmitter relay 5CTM is continuously closed so that the relay 5CTM directly repeats the code transmitter 180CT. Accordingly, the coded energy supplied to the rails of section 5T is not distorted and the impulses are not reduced in length, as might occur if the approach relay 5AR were required to release before the transmitter relay 5CTM could operate to cause an impulse of energy to be supplied to the section rails. As the energy of 180 code frequency supplied to the rails of section 5T is undistorted, the decoding means including resonant rectifier unit 180DU and the relay 5D associated with the track relay 5TR operate reliably and the relay 5D will be picked up. In addition, if the track section is provided with means, not shown, for supplying coded alternating current energy to the section rails to operate cab signal equipment on locomotives passing through the section, the decoding means on these locomotives will operate reliably.

When the train under consideration advances into section 5T the track relay 5TR remains released and the relays 5FP, 5H, and 5D become released with the result that energy is supplied to the red or stop lamp of the signal 5S.

After entrance of the train into section 5T, the supply of energy from the battery 5IB over the section rails continues to be prevented and relay 5AR remains released and there is no change in the equipment at the exit end of the section.

When the train vacates section 6T, the relay 6AFP picks up and its contact 28 interrupts the circuits of the lamps of signal 5S so that signal is dark, while contact 23 of relay 6AFP interrupts the circuit of the primary winding of the decoding transformer 5DT and it is deenergized.

When the train under consideration advances into section 4T the relay 4H releases and its contact 27 interrupts the circuit for supplying energy of 180 code frequency to the transmitter relay 5CTM and establishes a circuit for supplying energy of 75 code frequency thereto. When the train vacates section 5T, the energy of 75 code frequency supplied to the section rails feeds over the section rails and operates the track relay 5TR to pick up the relays 5FP and 5D and to cause relay 5ACR to operate as previously described so that an impulse of energy is supplied from battery 5IB to the section rails after each movement of the contacts of the track relay 5TR to their released positions. The energy supplied from the battery 5IB operates the relay 5AR as previously described and picks up relays 5AFP and 5ABP. As soon as relay 5AFP picks up, its contact 11 interrupts the circuit governed by contact 27 of relay 4H for supplying energy of 75 code frequency to the transmitter relay 5CTM and connects relay 5CTM directly to the 75 code transmitter so that energy of 75 code frequency is supplied to the relay 5CTM irrespective of the position of the contacts of relay 4H.

When the train advances far enough to vacate section 4T, the relay 4H picks up and the equipment is again in the condition in which it is illustrated in the drawing.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In a coded track circuit, in combination, a section of railroad track having at the first end thereof a first source of energy and a first code following relay having a contact biased to a released position and having at the second end thereof a second code following relay having a contact biased to a released position, a transmitter relay having a contact movable between a first position in which the winding of said first code following relay is effectively connected across the section rails and a second position in which said first source of energy is connected across the section rails, means effective on movement of the contact of said second code following relay from its picked-up to its released position to momentarily connect a second source of current across the section rails, a slow release relay which is energized when said first code following relay is responding to coded energy, an operating circuit for said transmitter relay effective when established to cause the transmitter relay contact to move from its first to its second position, said operating circuit including a contact of said first code following relay which is closed only when the contacts of said first code following relay are released, means effective when said slow release relay is deenergized for governing said operating circuit so as to cause said transmitter relay to be operated at times by coded energy of relatively high code speed and at other times by coded energy of relatively low code speed, means effective when said slow release relay is energized for governing said operating circuit so as to cause said transmitter relay to be operated only by coded energy of relatively low code speed, and a control circuit governed by means responsive to code following operation of said first code following relay.

2. In a coded track circuit signaling system, in combination, a stretch of railroad track divided into a plurality of track sections including an intermediate track section having adjacent the first end thereof a first track section and having adjacent the second end thereof a second track section, said intermediate track section having at the first end thereof a first source of energy and a first code following relay having a contact biased to a released position and having at the second end thereof a second code following relay having a contact biased to a released position, a transmitter relay having a contact movable between a first position in which the winding of said first code following relay is effectively connected across the rails of said intermediate section and a second position in which said first source of energy is connected across the rails of said intermediate section, a slow release relay which is energized when said first code following relay is responding to coded energy, means governed by occupancy of said second track section and effective on movement of the contact of said second code following relay from its picked-up to its released position to momentarily connect a second source of current across the rails of said intermediate section, means selectively responsive to operation of said second code following relay by energy of a low code speed or by energy of a high code speed for controlling entrance of traffic into said intermediate section from said second track section, an operating circuit for said transmitter relay effective when established to cause the transmitter relay contact to be moved from its first to its second position, said operating circuit including a contact of said first code following relay which is closed only when the contacts of said first code following relay are released, means governed by traffic conditions in said first track section and effective when said slow release relay is deenergized for governing said operating circuit so as to cause said transmitter relay to be operated at times by coded energy of said high code speed and to be operated at other times by coded energy of said low code speed, means effective when said slow release relay is energized for governing said operating circuit so as to cause said transmitter relay to be operated by coded energy of a low code speed regardless of traffic conditions in said first track section, and a control circuit governed by means responsive to code following operation of said first code following relay.

3. In a coded track circuit signaling system, in combination, a stretch of railroad track divided into a plurality of track sections including an intermediate track section having adjacent the first end thereof a first track section and having adjacent the second end thereof a second track section, said intermediate track section having at the first end thereof a first source of energy and a first code following relay having a contact biased to a released position and having at the second end thereof a second code following relay having a contact biased to a released position, a transmitter relay having a contact movable between a first position in which the winding of said first code following relay is effectively connected across the rails of said intermediate section and a second position in which said first source of energy is connected across the rails of said intermediate section, a slow release relay which is energized when said first code following relay is responding to coded energy, a signal governing movement of traffic from said second section into said intermediate section, means effective according as said second code following relay is operated by coded energy of low or of high code speed for causing said signal to display a caution or a clear indication, means governed by traffic conditions in said second track section to momentarily connect a second source of current across the rails of said intermediate section after each movement of the contacts of said second code following relay from their picked-up to their released position, an operating circuit for said transmitter relay effective when established to cause the transmitter relay contact to be moved from its first to its second position, said operating circuit including a contact of said first code following relay closed only when the contacts of said first code following relay are released, means effective when said slow release relay is deenergized for governing said operating circuit so as to cause said transmitter relay to be operated by coded energy of said high code speed or of said low code speed according as said first track section is vacant or is occupied, means effective when said slow release relay is energized for governing said operating circuit so as to cause said transmitter relay to be operated by coded energy of low code speed regardless of traffic conditions in said first track section, and a control circuit governed by means responsive to code following operation of said first code following relay.

4. In a coded track circuit signaling system, in combination, a stretch of railroad track divided into a plurality of track sections including an intermediate track section having adjacent the first end thereof a first track section and having adjacent the second end thereof a second track section, said intermediate track section having at the first end thereof a first source of energy and a first code following relay having a contact biased to a released position and having at the second end thereof a second code following relay having a contact biased to a released position, a transmitter relay having a contact movable between a first position in which the winding of said first code following relay is effectively connected across the rails of said intermediate section and a second position in which said first source of energy is connected across the rails of said intermediate section, a slow release relay which is energized when said first code following relay is responding to coded energy, a signal governing movement of traffic from said second section into said intermediate section, means effective according as said second code following relay is operated by coded energy of low or of high code speed for causing said signal to display a caution or a clear indication, means effective on movement of the contact of said second code following relay from its picked-up to it released position to momentarily connect a second source of current across the rails of said intermediate section, means responsive to occupancy of said second track section for rendering said last-named means ineffective, an operating circuit for said transmitter relay effective when established to cause the transmitter relay contact to be moved from its first to its second position, said operating circuit including a contact of said first code following relay which is closed only when the contacts of said first code following relay are released, means effective when said slow release relay is deenergized for governing said operating circuit so as to cause said transmitter relay to be operated by coded energy of said high code speed or of said low code speed according as said first track section is vacant or is occupied, means effective when said slow release relay is energized for governing said operating circuit so as to cause said transmitter relay to be operated by coded energy of low code speed regardless of traffic conditions in said first track section, and a control circuit governed by means responsive to code following operation of said first code following relay.

5. In a coded track circuit signaling system, in combination, a stretch of railroad track divided into a plurality of track sections including a selected track section having a first track section adjacent the first end thereof, said selected track section having at the first end thereof a first source of energy and a first code following relay having a contact biased to a released position and having at the second end thereof a second code following relay having a contact biased to a released position, a transmitter relay having a contact movable between a first position in which the winding of said first code following relay is effectively connected across the rails of said intermediate section and a second position in which said first source of energy is connected across the rails of said intermediate section, a slow release relay which is energized when said first code following relay is responding to coded energy, means effective on movement of the contact of said second code following relay from its picked-up to its released position to momentarily connect a second source of current across the rails of said selected track section, an operating circuit for said transmitter relay effective when established to cause the transmitter relay contact to move from its first to its second position, said operating circuit including a contact of said first code following relay which is closed only when the contacts of said first code following relay are released, means effective when said slow release relay is deenergized for governing said operating circuit so as to cause said transmitter relay to be operated by coded energy of said high code speed or of said low code speed according as said first track section is vacant or is occupied, means effective when said slow release relay is energized for governing said operating circuit so as to cause said transmitter relay to be operated by coded energy of low code speed regardless of traffic conditions in said first track section, and a control circuit governed by means responsive to code following operation of said first code following relay.

6. In a code transmitting and receiving means for a coded track circuit, a code following relay having a contact biased to a released position, a source of current, a transmitter relay having contacts movable between a first position in which the winding of said code following relay is effectively connected across the rails of a track section and a second position in which said source of current is connected across said rails, an operating circuit for said transmitter relay effective when established to cause the transmitter relay contacts to move from their first to their second position, said operating circuit including a contact of said code following relay which is closed only when the contacts of said code following relay are released, a slow release relay which is energized in response to code following operation of said code following relay, means effective when said slow release relay is deenergized for governing said operating circuit so as to cause said transmitter relay to be operated by coded energy of high code speed at times and to be operated by energy of low code speed at other times, means effective when said slow release relay is energized for governing said operating circuit so as to cause said transmitter relay to always be operated by coded energy of a low code speed, and a control circuit governed by means responsive to code following operation of said code following relay.

7. In master code transmitting means and feedback code receiving means for a coded track circuit, in combination, a code following relay having a contact biased to a released position, a source of current, a transmitter relay having contacts movable between a first position in which the winding of said code following relay is effectively connected across the rails of a track section and a second position in which said source of current is connected across said rails, a slow release relay which is energized in response to code following operation of said code following relay, means effective when said slow release relay is deenergized and including a contact of said code following relay closed only when said code following relay is released for at times operating said transmitter relay by coded energy of high code speed and at other times by coded energy of low code speed, means effective when said slow release relay is energized for always operating said transmitter relay by coded energy of a low code speed, and a control circuit governed by means responsive to code following operation of said code following relay.

8. In master code transmitting means and feed-back code receiving means for a coded track circuit, in combination, a code following relay having a contact biased to a released position, a source of current, a transmitter relay having contacts movable between a first position in which the winding of said code following relay is effectively connected across the rails of a track section and a second position in which said source of current is connected across said rails, a slow release relay which is energized in response to code following operation of said code following relay, means effective when said slow release relay is deenergized and including a contact of said code following relay closed only when said code following relay is released for at times operating said transmitter relay by coded energy of high code speed, means effective when said slow release relay is released for at other times operating said transmitter relay by coded energy of a low code speed, means effective when said slow release relay is energized for always operating said transmitter relay by coded energy of a low code speed, and a control circuit governed by means responsive to code following operation of said code following relay.

CHARLES W. FAILOR.

No references cited.